INVENTOR.
Peter W. Kelly
BY
Wolfe, Hubbard, Voit & Osann
ATTORNEYS

Sept. 30, 1969

P. W. KELLY 3,469,495

HOBBING MACHINE FOR CUTTING SPECIAL GEAR TOOTH
FORMS SUCH AS CROWNED OR TAPERED TEETH

Filed Dec. 20, 1967

INVENTOR.
Peter W. Kelly
BY
Wolfe, Hubbard, Voit & Osann
ATTORNEYS

Sept. 30, 1969　　　　　　P. W. KELLY　　　　　　3,469,495
　　　　　HOBBING MACHINE FOR CUTTING SPECIAL GEAR TOOTH
　　　　　　　FORMS SUCH AS CROWNED OR TAPERED TEETH
Filed Dec. 20, 1967　　　　　　　　　　　　　6 Sheets-Sheet 4

Fig. 9.

INVENTOR.
Peter W. Kelly
BY
Wolfe, Hubbard, Voit & Osann
ATTORNEYS

Sept. 30, 1969           P. W. KELLY           3,469,495
HOBBING MACHINE FOR CUTTING SPECIAL GEAR TOOTH
FORMS SUCH AS CROWNED OR TAPERED TEETH
Filed Dec. 20, 1967           6 Sheets-Sheet INVENTOR.
Peter W. Kelly
BY
Wolfe, Hubbard, Voit & Osann
ATTORNEYS

Fig. 14.

United States Patent Office
3,469,495
Patented Sept. 30, 1969

3,469,495
HOBBING MACHINE FOR CUTTING SPECIAL GEAR TOOTH FORMS SUCH AS CROWNED OR TAPERED TEETH
Peter W. Kelly, Rockford, Ill., assignor to Barber-Colman Company, Rockford, Ill., a corporation of Illinois
Filed Dec. 20, 1967, Ser. No. 692,032
Int. Cl. B23f 5/22, 5/24
U.S. Cl. 90—4                         19 Claims

ABSTRACT OF THE DISCLOSURE

For generating special types of gear tooth forms such as crowned or tapered teeth on a cylindrical workpiece while the teeth are being cut by a hob, a servo-controlled hydraulic actuator feeds the workpiece continuously along its radius to positions which vary (a) as a predetermined function of, and (b) at a predetermined ratio with, changes in the position of the hob as the latter is fed axially of the workpiece, the function being commanded by a rotatably driven cam which controls operation of the actuator in timed relation with the axial feed of the hob and which is selectively adjustable to vary the function and cause the generation of different types of tooth forms. To enable the use of the same cam for the production of many different shapes and sizes of specially formed teeth of any one type, the function commanded by the cam is converted into an electrical signal providing ultimate control of the actuator and capable of being selectively modified not only to cause changes in the position of the workpiece to occur at various selected ratios with respect to changes in the position of the hob but also to change the amount of material removed from the workpiece by the hob at any selected ratio.

---

This invention relates to hobbing machines of the type in which a hob and a generally cylindrical workpiece, both rotating about respective axes which lie in perpendicular planes, are traversed rapidly toward one another in a direction along a radius of the workpiece to bring the latter into operative position with the hob, are fed slowly relative to one another along the axis of the workpiece to effect the cutting of gear teeth on the periphery of the workpiece, and then are traversed rapidly away from each other after completion of the cut. More particularly, the invention relates to holding machines adapted to generate special tooth forms on the sides of the teeth, as for example, longitudinally crowned or tapered teeth, by feeding the hob and the workpiece relative to one another at a controlled rate along the radius of the workpiece as the axial feed proceeds and to positions determined by a command signal which varies in magnitude as a function of changes in the relative position of the hob axially of the workpiece.

Through such radial feeding, the depth of cut of the hob into the workpiece is gradually increased and/or decreased over the axial length of the workpiece in accordance with the particular function chosen and the command signal generated on the basis of that function. This results in the sides of the teeth being longitudinally curved or tapered instead of simply lying in flat axially extending planes. One type of special tooth form, e.g., a crowned tooth, may be generated by commanding first a gradual decrease and then a gradual increase in the depth of cut; while a different type of tooth form, such as a tapered tooth, may be produced with a command signal which causes solely either a progressive increase or a progressive decrease in the depth of cut during axial feeding of the hob.

An object of the present invention is to reduce the cost of introducing a controlled radial feed system into a conventional hobbing machine and, at the same time, to produce gears more dimensionally precise than those obtained from prior machines equipped to generate special tooth forms. This is achieved in the present instance by utilizing the same actuator existing in the conventional machne for rapidly traversing the workpiece along its radius for also effecting the controlled radial feed of the workpiece in a continuous and dynamic manner, thereby to eliminate dimensional errors formerly resulting from intermittent starting and stopping of the radial feed or from uneven movement of the workpiece during the radial feed.

A related and more detailed object is to command the energization of an existing fluid-operated rapid traverse actuator as a function of and in timed relation with changes in the position of the hob to enable the production of special tooth forms without the need of providing a separate radial feed actuator.

Another object of the invention is to provide a hobbing machine of the above character with a simplified and extremely versatile mechanical command element with which appropriate command signals for producing different types of tooth forms can be selectively created without making complicated adjustments of the element and without requiring the use of a separate element for each type of tooth form.

An important object is to provide a novel control responsive to the function commanded by the mechanical element but capable of modifying within a wide range the ratio with which the position of the workpiece varies wth respect to changes in the position of the hob, so that tooth forms of various shapes and sizes of any given type can be produced with the same element simply by adjusting the setting of the control.

A further object is to provide a control which is capable of effecting the production of specially formed teeth during a rough cutting cycle of the hob while leaving a selectively variable and precisely determined amount of stock remaining on the teeth for removal during a second, finish cutting cycle.

Still another object is to utilize the command element and the control for effecting precise radial feeding of the workpiece independently of the feed of the hob.

The invention also resides in the ease and convenience with which the machine may be set up to generate different types and shapes of tooth forms on workpieces of various sizes.

These and other objects and advantages of the invention will become apparent as the following detailed description is considered in conjunction with the accompanying drawings, wherein.

While the invention has been shown and will be described in some detail with reference to a particular embodiment thereof, there is no intention that it thus be limited to such detail. On the contrary, it is intended here to cover all alternatives, modifications, and equivalents falling within the spirit and scope of the invention as defined by the appended claims.

General organization and operation of an exemplary hobbing machine

Referring to the drawings, there is illustrated an exemplary hobbing machine 15 with which a gear 16 (FIG. 2) having teeth 17 is cut from a cylindrical gear blank or workpiece 19 (FIG. 1) adapted to be secured to a vertical work spindle 20 for rotation in timed relation to a toothed hob 21 which is fast on a horizontal hob or tool spindle 23. Herein, the work spindle 20 is journaled for rotation in a work support or slide 24 mounted for horizontal movement back and forth along ways 25 on a base 26 to shift the workpiece toward and away from the hob in a direction radially of the workpiece, and thus locate the latter in position for cutting engagement with the hob. The hob spindle 23 is journaled to turn about a horizontal axis on a support or carriage 27 which is slidable up and down along vertical ways 29 on a column 30 upstanding from the base and which, during a normal hobbing operation, is advanced downwardly relative to the workpiece to feed the rotating hob across the rotating workpiece parallel to the axis of the latter, so that the hob teeth cut the gear teeth 17 in an operation which basically is well known. It will be understood by those skilled in the art that the relative movement of the hob parallel to the axis of the workpiece could be achieved equally well by shifting the work spindle 20 vertically and that the relative movement of the hob toward or away from the workpiece parallel to a radius of the latter could be achieved by shifting the hob spindle 23 horizontally. For convenience in the present description, such relative movements will be called simply axial feed and radial feed, respectively.

Figure 5:
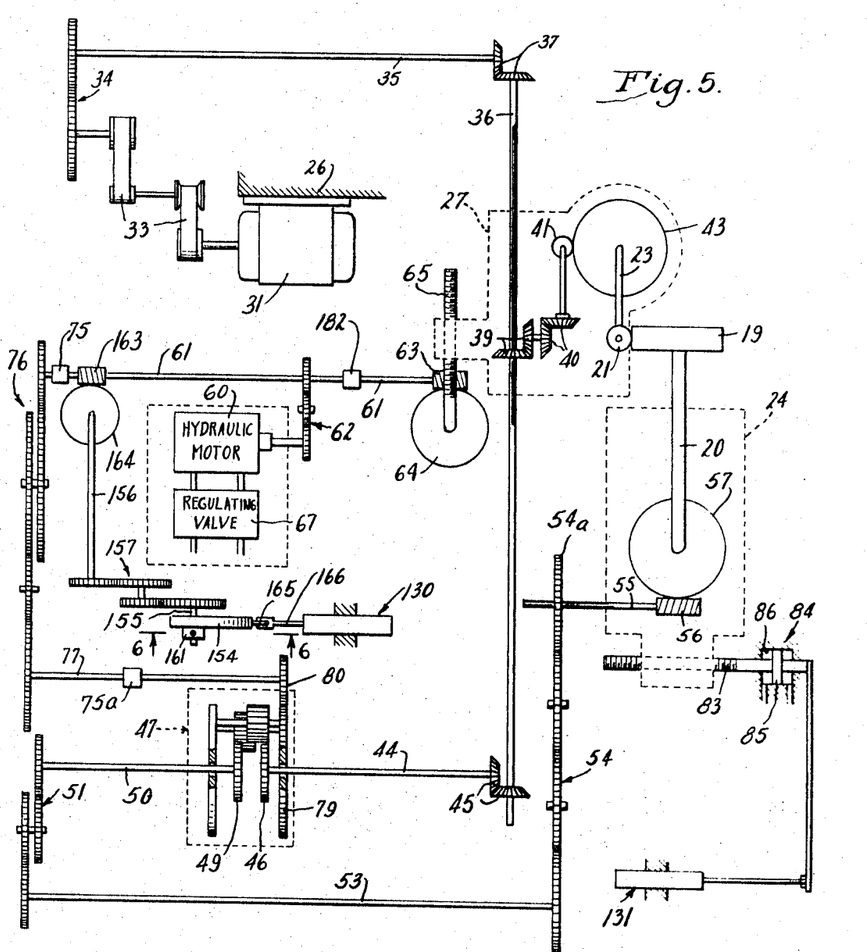
FIG. 5 is a diagrammatic illustration of the drive mechanism for the machine.

To rotate the work spindle 20 and the hob spindle 23 in timed relation, an electric motor 31 (FIG. 5) suitably mounted in the base 26 acts through belts 33 and gearing 34 to rotate a shaft 35 connected to a main drive shaft 36 by bevel gearing 37. Through sets of mating bevel gears 39 and 40 spline driven from the shaft 36 and mounted on the hob carriage, the main shaft drives a pinion 41 meshing with a gear 43 fast on the hob spindle 23 and operable to rotate the hob 21 in response to turning of the main shaft. Rotational drive for the work spindle 20 is picked off from the main shaft 36 by a shaft 44 connected to the main shaft by bevel gears 45 and driving one input gear 46 of a differential 47, the output gear 49 of the differential being connected by a shaft 50 to a set of index change gears 51. A shaft 53 transmits the motion of the index change gears to a further train of gears 54 which, in turn, rotate the work spindle 20 and the workpiece 19 by means of a shaft 55 to which is keyed a worm 56 meshing with a worm gear 57 fast on the lower end of the work spindle. The shaft 55 is splined to the terminal gear 54a of the train 54 to accommodate horizontal shifting of the work slide 24. For purposes of simplifying the drawings, the various shafts and gearing forming the drive train of the machine have, for the most part, been shown diagrammatically in FIG. 9 as being housed in a single gear box which is indicated generally at 59.

An axial feed mechanism, herein comprising a reversible variable speed hydraulic motor 60 (FIG. 5), rotates an axial drive shaft 61 through gears 62 to advance the hob 21 axially of the workpiece 19. One end of the drive shaft 61 is coupled by a worm 63 and a worm gear 64 to a lead screw 65 threadably connected to the hob carriage 27, such that the latter is moved along the ways 29 in response to rotation of the drive shaft. The speed and direction of rotation of the hydraulic motor may be controlled by a regulating valve 67 associated with the motor.

When hobbing helical gears, it is necessary to modify the normal timed rotational relationship of the hob 21 and the workpiece 19 as the axial feed proceeds in order to compensate for the lead or helix angle. This is achieved in a conventional manner by connecting the axial drive shaft 61 through a differential drive clutch 75 and a set of lead change gears 76 to a shaft 77. The latter, through a normally disengaged differential brake 75a, is drivingly connected to the second input gear 79 of the differential 47 by a gear 80. When the clutch 75 is engaged and brake 75a is disengaged, rotation of the axial drive shaft 61 is transmitted to the input gear 79 to advance or retard rotation of the output gear 49 of the differential, and thus the rate of rotation of the workpiece, thereby to modify the rotational timing relation between the workpiece and the hob in response to axial feeding of the hob.

Figure 7:
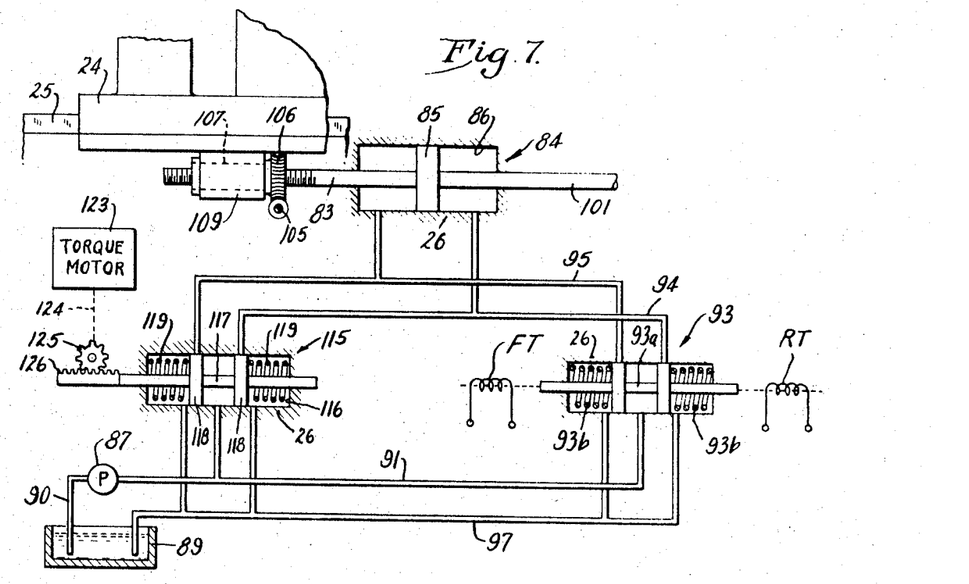
FIG. 7 is a diagram of a fluid circuit for controlling the fluid-operated actuator.
Figure 8:
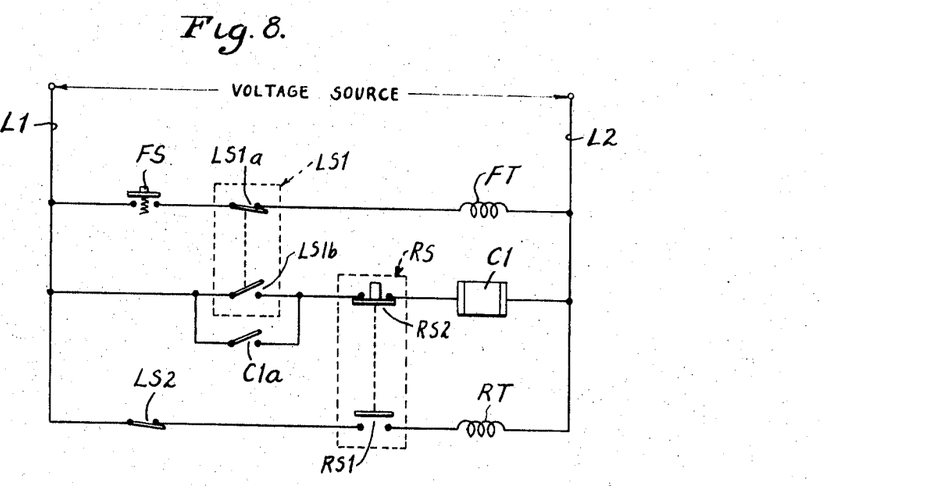
FIG. 8 is a schematic circuit diagram of certain electrical controls associated with the fluid-operated actuator.

Prior to axial feeding of the hob 21, the workpiece 19 usually is radially traversed rapidly toward the hob into position for cutting engagement with the latter, and then is radially traversed rapidly away from the hob after completion of the cut. For this purpose, a piston rod 83 (FIG. 9) of a hydraulic actuator 84 is connected at one end to the underside of the work slide 24 and is connected at its opposite end to a piston 85 which slides back and forth in a cylinder 86 in response to the admission of pressure fluid into opposite ends of the cylinder. The cylinder is anchored on the base 26 and is supplied with pressure fluid by a hydraulic pump 87 (FIGS. 7 and 9) communicating with a sump 89 by means of a conduit 90. Pressure fluid or hydraulic oil from the pump is delivered through a supply conduit 91 (FIG. 7) to a solenoid-actuated four-way valve 93 which includes a slidable spool 93a normally held in a closed or centered position by springs 93b. To advance the work slide rapidly toward the hob, a forward traverse solenoid FT is energized from power lines $L_1$ and $L_2$ (FIG. 8) by closure of a manually-actuated push button switch FS and acts to shift the valve spool to the right of its normally centered position, thereby to admit pressure fluid into the right end of the cylinder 86 through a conduit 94. The fluid in the opposite end of the cylinder exhausts through a conduit 95, the valve, and a return line 97 connected between the valve and the sump.

Rapid advance of the work slide 24 continues until a dog 98 (FIG. 9) movable with the piston 85 engages a wedge-like stop 99 in its path to prevent further movement of the slide. The dog is shown schematically as being carried at the upper end of a vertical arm 100 which is fastened to a rod 101 projecting rearwardly from and movable with the piston. The wedge 99 is mounted on the lower end of an adjusting screw 102 threaded in the base 26 and may be raised and lowered by the screw to engage the dog and prevent further movement of the slide when the latter reaches various different positions during its advance stroke. As a result, the distance between the work spindle 20 and the hob spindle 23 in the extreme advanced position of the slide may be changed by adjusting the position of the wedge. Carried on and adjustable with the wedge is a limit switch LS1 which is actuated by the dog as the latter engages the wedge and which, upon being actuated, opens normally closed switch contacts LS1a (FIG. 8) to de-energize the forward traverse solenoid FT and cause re-centering of the rapid traverse valve spood 93a (FIG. 7), thereby to terminate the flow of pressure fluid to the cylinder 86 through the valve. Rapid return of the slide may be effected by depression of a second push button switch RS to close switch contacts RS1 and energize a reverse traverse solenoid RT which shifts the valve spool to the left of its centered position to admit pressure fluid into the left end of the cylinder through the conduit 95 and to dump the fluid in the right end of the cylinder to the sump 89 through the conduit 94, the valve and the return line 97. When the slide is fully retracted, the dog 98 engages a second limit switch LS2 (shown only in FIG. 8) to de-energize the reverse traverse solenoid RT and cause re-centering of the valve spool 93a.

For a purpose to be described in detail below, the work slide 24 is adapted to be adjusted manually along the piston rod 83 by the operator of the machine. Such adjustment may be made by turning the handle 104 (FIG. 1) of an operating screw 105 (FIG. 9) projecting inwardly through the work slide 24 and meshing at its inner end with a worm gear 106 drivingly coupled to a rotatable nut 107 threaded onto the forward end of the piston rod. The nut is housed within a bearing lug 109 depending from the underside of the work slide and is held against axial movement relative to the slide. Thus, rotation of the nut along the threaded piston rod in response to turning of the operating screw 105 results in translation of the slide along the ways 25 and relative to the piston rod 83. With this arrangement, the horizontal distance between the work spindle 20 and the hob spindle 23 in the extreme advanced position of the slide may be adjusted independently of the position of the piston rod and without changing the location of the adjustable wedge 99.

For the most part, the various elements of the machine thus far described are conventional and are incorporated in many hobbing machines now in commercial use. In setting up such a machine for the hobbing of a typical gear, the operator will adjust the position of the wedge 99 and will adjust the position of the work slide 24 along the piston rod 83 with the operating screw 105 so that, with a workpiece 19 of given diameter secured to the work spindle 20, the workpiece will be advanced to a preselected position beneath the hob 21 upon completion of the forward traverse stroke of the hydraulic actuator 84. The position to which the workpiece is advanced beneath the hob is, of course, determined by the depth to which the hob must cut radially into the workpiece to form the gear teeth 17 with a desired depth. With the workpiece properly positioned, the hob is fed downwardly along the axis of the workpiece by the hydraulic motor 60, and such feeding, along with the synchronous rotation of the hob and the workpiece, results in the formation of the teeth 17 on the periphery of the workpiece in a manner well understood by those skilled in the art. When the gear 16 is completed, it is rapidly retracted away from the hob by the hydraulic actuator, the hob is retracted upwardly to its starting position, and a new workpiece is placed on the work spindle for advancement beneath the hob.

Figure 2:
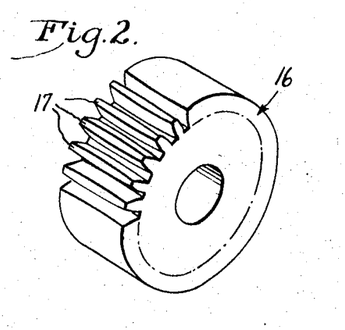
FIG. 2 is a perspective view of a gear formed by the machine and having longitudinally crowned teeth.
Figure 3:
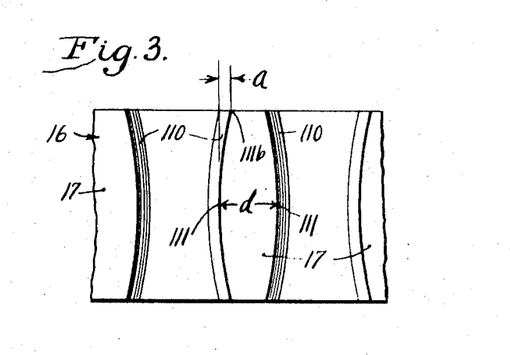
FIG. 3 is an enlarged, fragmentary developed view of the gear shown in FIG. 2.
Figures 13, 15, 16:
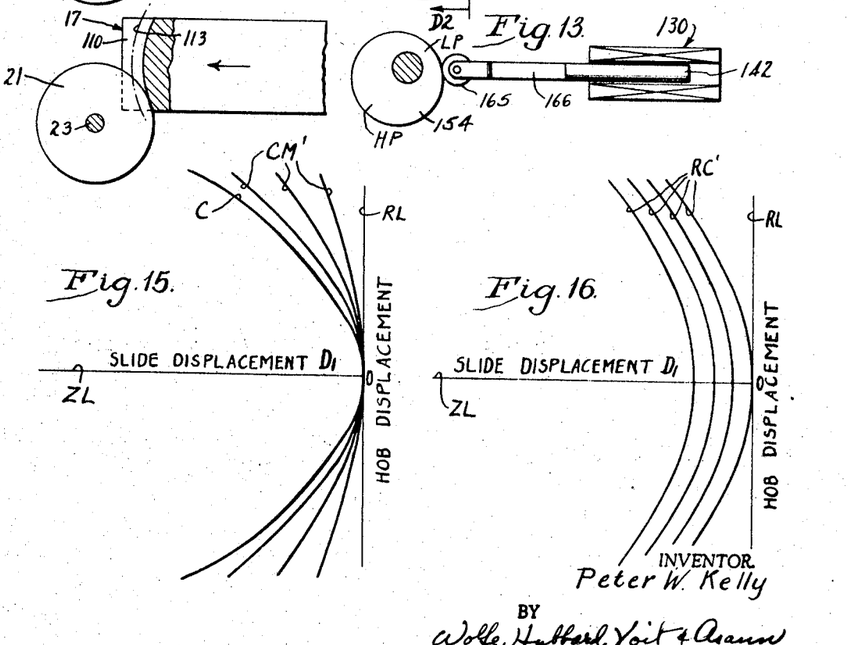
FIGS. 15 and 16 are graphs similar to FIG. 14 but having families of curves which are variations of those of FIG. 14.

It is often desirable to cut gears with special forms of teeth in order to reduce detrimental effects known to occur during certain circumstances of gear use. Among these effects are excessive tooth breakage, backlash, tooth deflection under load, and noisy running. One specific example of a special tooth form is illustrated in FIGS. 2 and 3 in which the teeth 17 of the gear 16 are longitudinally crowned, that is to say, each side 110 of each tooth, instead of lying in a flat axially extending plane, is curved convexly and symmetrically from the opposite faces of the gear to a high point 111 located at the vertical or longitudinal center of the tooth. In the present instance, the teeth are crowned during their formation by gradually reducing the depth of cut of the downwardly moving hob 21 into the workpiece 19 until the axis of the hob reaches a position in which it is alined horizontally with the vertical center of the workpiece, and then by increasing the depth of cut to the initial or starting value as the downward movement of the hob proceeds. This is achieved herein by first retracting the workpiece radially away from the hob in timed relation with the feed of the hob and to positions which vary as a predetermined function of changes in the position of the hob axially of the workpiece. After the axis of the hob reaches the vertical center of the workpiece, the depth of cut is increased gradually to its initial value by advancing the workpiece radially toward the hob and by changing the relative positions of the two in accordance with the same function. Such controlled radial feeding of the workpiece forms a barrel-shaped pitch surface 113 (FIG. 13) on the gear and, at the same time, results in the generation of teeth with crowned sides 110 since different widths of the hob teeth cut and form different axial portions of the gear teeth.

Thus, by radial feeding of the workpiece 19 according to a function which first causes gradual retraction and then gradual advancement of the workpiece during axial feeding of the hob 21, crowned teeth 17 may be produced. Also, by controlled radial feed during cutting, a second type of special tooth form may be produced, such as the tapered teeth 17' on a gear 16' (FIG. 4), in which opposite sides 110' of each tooth diverge away from each other from one face of the gear to the other. The tapered teeth may be formed by controlling the radial feed during cutting according to a selected function of axial feed to produce either a gradual retraction or a gradual advancement of the workpiece during the entire cutting stroke of the hob, thereby to progressively decrease or progressively increase the depth of cut of the tapered hob teeth into the workpiece. Accordingly, by varying the function by which the radial feed is controlled relative to the axial feed, different types of special tooth forms may be produced.

Controlled radial feed mechanism

In accordance with one aspect of the present invention, mechanism existing in the hobbing machine 15, herein the hydraulic actuator 84, is utilized to advantage to effect controlled and very accurate radial feeding of the workpiece 19. The actuator is governed in a novel manner to provide a substantially continuous and dynamic radial feed precisely correlated, according to a desired function, with the axial feed of the hob 21. In this way, the actuator for rapidly advancing and retracting the workpiece also may be used selectively as a radial feed mechanism for the generation of special tooth forms, and the continuous radial feeding effected by the actuator serves to reduce production errors which otherwise would result from intermittent starting and stopping of radial feed and/or from uneven movement of the workpiece.

In the present instance, radial feeding of the workpiece 19 takes place after the latter has been rapidly advanced beneath the hob 21 by the hydraulic actuator 84 and after the spool 93a of the rapid traverse valve 93 has been shifted to its centered position by the de-energization of the solenoid FT as a result of engagement of the dog 98 with the limit switch LS1. After the flow of oil to the cylinder 86 of the actuator 84 through the rapid traverse valve 93 has terminated and as the hob is fed through the workpiece, the work slide 24 is displaced with a controlled feeding motion in response to the continuous metering of oil into and out of opposite ends of the cylinder through a servo-controlled valve 115 (FIGS. 7 and 9) in an amount and in a direction which are governed as a predetermined function of axial feed. Thus, when forming a gear 16 with crowned teeth 17, oil is admitted through the servo-valve and into the left end of the cylinder as the hob cuts through the upper half of the workpiece, thereby to retract the latter and to gradually reduce the depth of cut. When the axis of the hob reaches the vertical center of the workpiece, oil is admitted into the right end of the cylinder to advance the workpiece toward the hob and gradually increase the depth of cut as the hob works through the lower half of the workpiece.

More specifically, the servo-valve 115 comprises a housing 116 (FIGS. 7 and 9) mounted in the base 26 and defining a bore slidably receiving a spool 117 formed with a pair of spaced lands 118. Pressure fluid from the pump 87 is admitted into the bore 116 through the supply line 91 which communicates with the bore at a centrallly located point disposed between the lands. The spool is normally held centered within the bore by a pair of coil springs 119 telescoped into the bore and over opposite ends of the spool and, in the centered position, the lands 118 close a pair of ports opening out of the bore and communicating with the lines 94 and 95 leading to the cylinder 86. Shifting of the spool to the right or left of the centered position respectively introduces pressure fluid into the right or left end of the cylinder 86 through the lines 94 or 95. When the actuator 84 is being controlled by the servo-valve 115, the rapid traverse valve spool 93a is held in its inactive, centered position, and fluid exhausted from the cylinder 86 is returned through the valve 115 and to the sump 89 through the return line 97 which communicates with opposite ends of the bore 116. To simplify the drawings, the rapid traverse valve 93 has been omitted from the hydraulic circuit shown in FIG. 9.

In order to feed the workpiece 19 toward or away from the hob 23 in correlation with the axial feeding of the latter so as to produce special tooth forms, the spool 117 of the servo-valve 115 is adapted to be shifted automatically to positions admitting hydraulic oil into the actuator cylinder 86 under pressure sufficient to move the work slide 24 in the desired direction and to the desired position. Such shifting of the spool occurs in response to an electrical signal $e_e$ (FIG. 9) which preferably is determined by both (1) a variable command signal representing the instantaneous desired or commanded position of the work slide 24 for the particular tooth form being generated and (2) a feedback signal representative of the instantaneous actual position of the slide as the radial feed of the workpiece proceeds. For this purpose, provision is made to generate a continuously changing command signal $e_c$ which normally varies in magnitude as a predetermined function of changes in the position of the hob axially of the workpiece; and to combine the command signal algebraically with a feedback signal $e_f$ which is obtained by detecting the actual position of the work slide 24 and which varies in magnitude in proportion to the displacement of the slide. If the command and feedback signals differ in magnitude, thus indicating that the slide is not located in the commanded position, the error signal $e_e$ resulting from that algebraic combination is proportional to the difference between the command and feedback signals and is supplied, preferably after amplification, to a signal-responsive means 123 (FIG. 9) for shifting the spool 117 and conditioning the servo-valve 115 to cause movement of the slide to the commanded position. When the slide is short of the commanded position, the error signal will have one sense and, if the slide has moved past the commanded position, the error signal will be of the opposite sense.

While the signal-responsive means 123 for shifting the spool 117 of the servo-valve 115 may take various specific forms, herein these means comprise a reversible torque motor having a drive shaft 124 which carries a pinion 125 adapted to mesh with the teeth of a rack 126 connected to one end of the spool. The error signal (after amplification and in some cases modification) is applied to the field windings 123a of the motor so that torque is exerted on the shaft 124 to shift the spool a proportional distance away from its centered position until the reactive force of one of the centering springs 119 counterbalances the motor torque. The displacement of the valve spool is proportional to the magnitude of the error signal and is in a direction corresponding to the sense of such signal. With the spool thus shifted, hydraulic oil is metered through the valve 115 and into the cylinder 86 in a direction to move the work slide 24 to a position which agrees with the commanded position, and at a rate which is generally proportional to the error signal. Should the actual and commanded positions of the slide correspond with one another, the error will be eliminated and the signal $e_e$ will go to zero to terminate rotation of the drive shaft 124. The contracted spring 119 then may return the spool 117 to its centered position to stop the flow of oil to the cylinder 86. The servo loop acts so fast that, for purposes of discussion, it may be assumed that the actual position of the slide 24 continuously and instantaneously is kept in agreement with the commanded position represented by the command signal $e_c$ as the latter varies.

In actual operation of the machine, however, a substantially continuous flow of oil will be supplied to the cylinder 86 when the latter is being controlled by the servo-valve 115 in response to a changing command signal $e_c$, since the error signal $e_e$ will not quite go to zero, and the spool 117 will not be centered. That is, a "dynamic" error will almost always be present since a very short interval of response inherently exists from the time the command signal $e_c$ directs movement of the slide 24 to a new position until the time the slide actually reaches such position. Accordingly, pressure fluid is substantially continuously supplied to the cylinder 86 to effect a continuous and dynamic radial feed of the workpiece 19. Such continuous feeding of the workpiece minimizes dimensional inaccuracies which otherwise would be introduced during the cutting of the gear teeth as a result of uneven starting and stopping of the slide 24 along the ways 25. Moreover, by feeding the workpiece radially with the same actuator 84 and the same fluid supply system already existing in most conventional hobbing machines for rapidly traversing the workpiece, the cost of adding to the machine a controlled radial feed system for the production of special tooth forms is significantly reduced.

Reviewing briefly, special tooth forms are produced by feeding the workpiece 19 radially while the hob 21 is being fed axially of the workpiece. The positions to which the workpiece is fed are determined by a command signal $e_c$ which varies in magnitude as a predetermined and usually non-linear function of changes in the position of the hob. Thus, when forming crowned teeth 17, the command signal gradually decreases in magnitude to direct a retraction of the work slide 24 as the hob cuts through the upper half of the workpiece. After the axis of the hob reaches the vertical center of the workpiece, the command signal increases in magnitude to cause a gradual advancement of the slide. The command signal $e_c$ is combined with the feedback signal $e_f$ which is obtained by sensing the actual position of the work slide. When the command and feedback signals differ in magnitude, indicating that the commanded and actual positions of the slide are not in agreement, the error signal $e_e$ is produced and is utilized to shift the spool 117 of the servo-valve 115 to a position admitting into the cylinder 86 a flow of hydraulic oil effective to keep the slide moving so that its actual position is substantially matched to the changing commanded position.

Generating the command and feedback signals

In the illustrated embodiment, both the command signal $e_c$ and the feedback signal $e_f$ are created by signal generators which preferably but not necessarily are in the form of linear variable differential transformers 130 and 131 (FIG. 9); the transformer 130 being the so-called "master" and being actuated as a function of changes in the position of the hob 21 to produce the command signal $e_c$, and the transformer 131 being the "slave" and being actuated in accordance with changes in the actual position of the work slide 24 to produce the feedback signal $e_f$. As is well known to those skilled in the art, a linear variable differential transformer is designed with a primary winding, two secondary windings and a displaceable element in the form of a linearly movable core. In some reference position of the core (usually called the "null" position) the output voltages from the individual secondaries are of equal amplitude and of opposite phase relation. The secondary windings are connected in series opposition so that their outputs tend to cancel. Thus, when the core is in its null position, the output voltage across the secondary windings is zero. Any physical displacement of the core from the null position, however, causes the voltage in one secondary to increase while simultaneously reducing the voltage appearing in the other secondary. The difference between the voltages appears across the output terminals of the serially opposed secondaries and is proportional in amplitude and agreeable in phase polarity with the extent and sense of the displacement of the core from the reference position. By detecting the magnitude and the phase of the output voltage across the secondaries, the extent and direction of linear movement of the core from the null position may be determined. Conversely, by displacing the core through predetermined distances in accordance with a selected function, a signal representative of the function will be produced across the secondaries.

Figure 1:
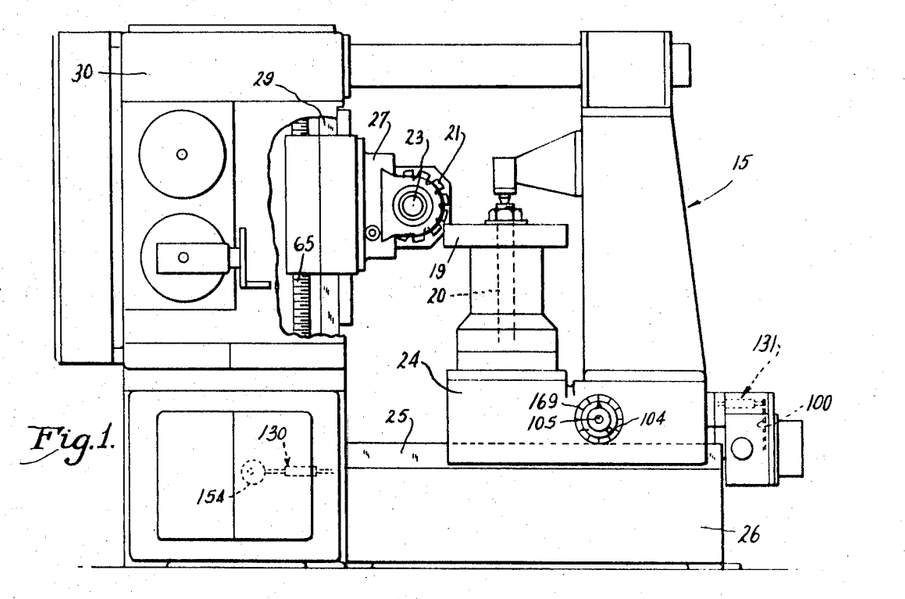
FIG. 1 is a side elevation of an exemplary hobbing machine embodying the novel features of the present invention.
Figure 9:
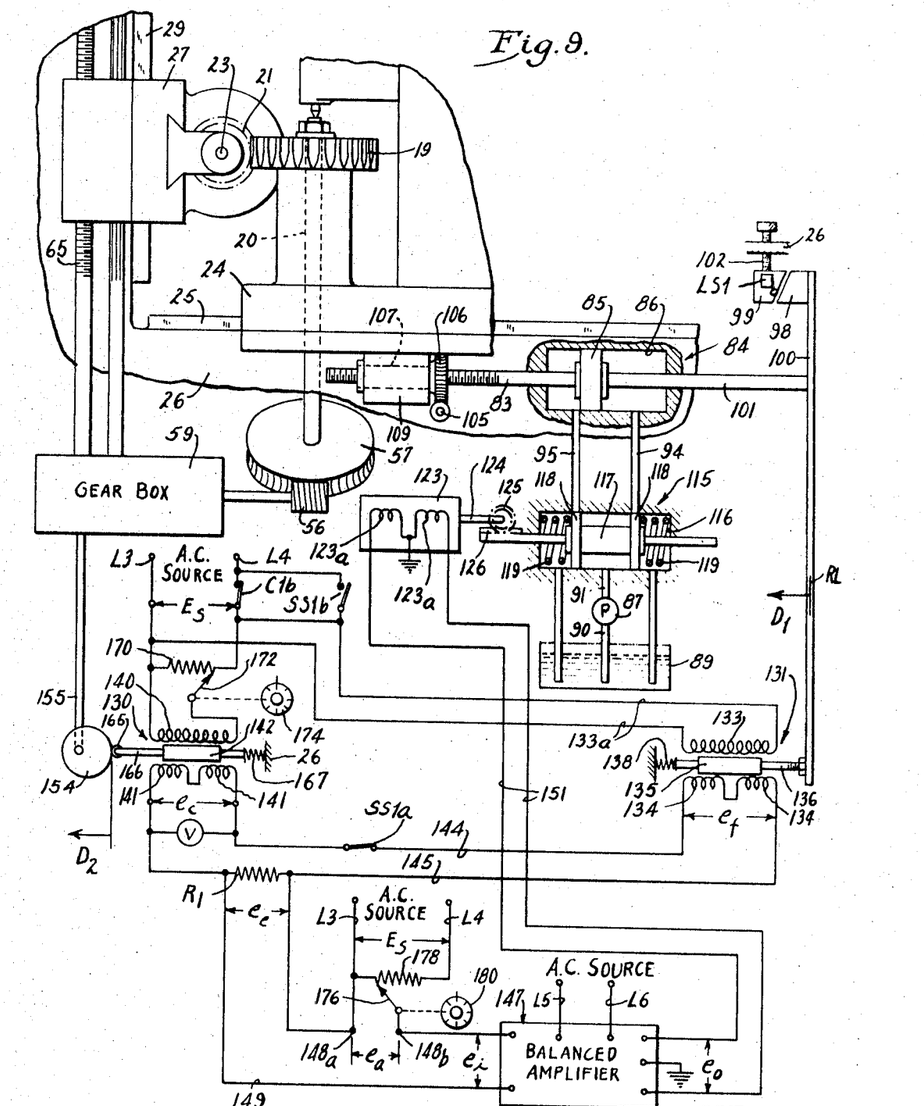
FIG. 9 is a fragmentary, diagrammatic view of the machine together with fluid and electric controls shown partly schematically and partly in block form.

As shown most clearly in FIGS. 1 and 9, the slave transformer 131 for sensing the actual position of the work slide 24 is mounted on the base 26 adjacent the rear end of the slide and includes a primary winding 133 excited via conductors 133a with A.C. source voltage $E_s$ from suitable power lines $L_3$, $L_4$. Slidable between the primary windings and a pair of serially connected secondary windings 134 is a linearly movable core 135. The latter includes an extension 136 which projects toward the arm 100 fastened to the rod 101. During the initial advancement of the slide 24 by the hydraulic actuator 84, the arm 100 is spaced from the extension 136 and thus does not displace the core 135. Upon continued movement of the slide, however, the arm abuts the end of the extension 136 so that the motion of the arm 100 is transmitted to the core to displace the latter in proportion to the amount of additional movement of the slide. In this particular instance, when the wedge 99 has been adjusted to stop the work slide 24 after it has been advanced through a 3″ forward traverse stroke by the actuator 84, the arm 100 first abuts the extension after the slide has moved through 2⅝″. Accordingly, the core 135 is displaced only through the last ⅜″ of a full 3″ slide stroke. When the work slide is retracted, the core is displaced reversely through a ⅜″ stroke by a compression spring 138 bearing against one end of the core. The spring presses the extension 136 against the arm 100 until the core has been displaced reversely through ⅜″, at which time the spring 138 reaches its extended limit and no longer displaces the core so that the latter does not move during the remaining 2⅝″ of the return stroke.

Accordingly, back and forth movement of the rod 101 and the arm 100 as the work slide 24 is advanced and retracted through a given length of its full stroke causes displacement of the core 135 and a resulting variance in the output voltage $e_f$ appearing across the output terminals of the secondary windings 134, such voltage representing the feedback signal which is indicative of the actual position of the work slide. Assuming simply for purposes of discussion that the core 135 is in a null position with respect to the primary and secondary coils 133, 134, and that the output voltage $e_f$ therefore is zero, at the instant the arm 100 begins displacing the core during the forward traverse stroke of the work slide 24, the amplitude of the output voltage $e_f$ will increase proportionally to increases in the horizontal distance $D_1$ (FIG. 9) through which the slide 24, the arm 100, and the core 135 are displaced from an imaginary reference line RL located at the position occupied by the arm when the transformer 131 is nulled and when displacement of the core is first begun. The voltage $e_f$ thus is indicative of the displacement $D_1$ of the work slide from a given reference position RL and is representative of the actual position of the slide.

The master transformer 130 for generating the command signal $e_c$ is substantially identical to the slave transformer 131 and is mounted within the base 26 beneath the hob carriage 27 (FIGS. 1 and 9). The master transformer includes a primary winding 140 excited by the source voltage $E_s$ from the power lines $L_3$ and $L_4$, a pair of secondary windings 141 connected in series opposing relation, together with a slidable core 142 displaceable as a predetermined function of changes in the position of the hob 21 axially of the workpiece 19. As the core 142 is displaced, the electrical signal or voltage $e_c$ is generated across the output terminals of the secondaries 141 and varies linearly in amplitude according to the movement of the core. The latter is shifted by a non-linear command element to be described. The voltage $e_c$ therefore constitutes the command signal.

To algebraically subtract the command voltage $e_c$ from the feedback voltage $e_f$, the output terminals of the secondaries 141, 134 of the two transformers 130 and 131 are connected in series bucking relation by lines 144 and 145 and a resistor $R_1$. The error signal $e_e$ equal to the difference between the two voltages and of the same phase as the larger of the two thus appears across the resistor $R_1$. The magnitude of the error signal $e_e$ is proportional to the difference between the desired position of the work slide 24 as commanded by the master transformer 130 and the actual position of the work slide as detected by the slave transformer 131. The phase polarity of the error signal depends upon whether the actual position of the slide lies to the left or the right of the commanded position.

For the purpose of amplifying the error voltage $e_e$ and the variations which occur therein, so that the torque motor 123 may be controlled according to the magnitude and sense of the error, a balanced amplifier 147 (FIG. 9) has its input terminals connected across the resistor $R_1$ by lines 148 and 149. The amplifier is connected across a source of operating power having lines $L_5$, $L_6$, and responds in a conventional manner to an input voltage $e_i$ applied across its input terminals to create an amplified output voltage $e_o$ at its output terminals. Normally, the input voltage $e_i$ is equal to the error voltage $e_e$. The D.C. output voltage $e_o$ is proportional in magnitude to the input voltage $e_i$ and of a polarity which corresponds to the phase of the voltage $e_i$ relative to the source voltage $E_s$. The output voltage is supplied to the torque motor 123 via lines 151 connected between the output terminals of the amplifier and the field 123a of the motor. Thus, an amplified D.C. form $e_o$ of the A.C. error signal $e_e$ is normally transmitted to the torque motor to shift the servovalve spool 117 to a position admitting pressure fluid into the actuator cylinder 86 at a rate proportional to the magnitude of the error signal and in a direction determined by the phase of the error signal such that the actuator 84 moves the slide 24 to reduce the error to zero.

Advantageously, the command signal $e_c$ is caused to vary in magnitude as a function of changes in the position of the hob 21 by a mechanical command element in the form of a rotary driven cam 154 (FIGS. 5 and 9 to 13) which is capable of effecting the generation of both crowned and tapered teeth and which, at the same time, is of extremely simple and inexpensive construction. The cam is rotated in timed relation with the axial feed of the hob and is shaped to displace the core 142 of the master transformer 130 according to the function necessary to produce a given tooth form. As a result, the command signal $e_c$ is made to change in a predetermined, usually non-linear fashion with changes in the position of the hob so that the radial position of the workpiece 19 will always be correlated with the axial position of the hob.

Figure 6:
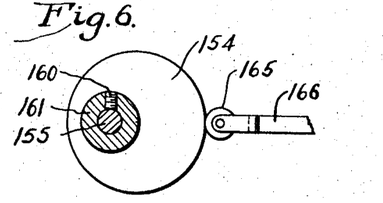
FIG. 6 is an enlarged fragmentary cross-section taken along the line 6—6 of FIG. 5.

Herein, the cam 154 is mounted in the base 26 adjacent the master transformer 130 and is coupled to one end of a shaft 155 (FIG. 5) which is rotatably connected to a shaft 156 by gearing 157. A set screw 160 (FIG. 6) extending through a hub 161 on the cam fastens the latter on the shaft 155 and may be released to permit angular adjustment of the cam relative to the shaft. Power for rotating the cam is picked off from the axial drive shaft 61 by means of a worm 163 on the axial drive shaft meshing with a worm wheel 164 on the shaft 156. Since the cam is driven by the axial drive shaft 61, the rotational rate of the cam is timed with respect to the feed of the hob, and thus the cam turns clockwise through a predetermined angular distance for each increment of downward movement of the hob.

To displace the core 142 of the master transformer 130 with the cam 154, a follower 165 (FIG. 9) is attached to an extension 166 on one end of the core and is urged against the periphery of the cam by a compression spring 167 located at the other end of the core. In keeping with the invention, the cam is simply a circular disk which is eccentrically mounted on the cam shaft 155 so that, starting with the follower in engagement with the cam at its high point HP (FIG. 12) or point of maximum eccentricity, the core is shifted toward the shaft 155 as the cam rotates, and is displaced through a progressively increasing distance $D_2$ which becomes maximum as the follower approaches the low point LP or point of minimum eccentricity of the cam. The primary and secondary coils 140 and 141 of the master transformer are positioned relative to the core 142 such that the transformer is nulled and the command voltage $e_c$ therefore is zero when the follower 165 is located at the high point of the cam and the displacement distance $D_2$ is zero. As the cam rotates and causes displacement of the core, the voltage $e_c$ increases in proportion to increases in the displacement $D_2$.

As a specific but in no sense limiting example, the size and eccentricity of the cam 154 are chosen such that the master core 142 will be displaced through a distance $D_2$ of ⅜″ as the cam turns through an angle of 180 degrees with the follower 165 initially disposed against the high point HP of the cam. The ratio of the gearing 157, 163 and 164 between the axial drive shaft 61 and the cam shaft 155 is chosen such that the cam is rotated through one full revolution as the hob 21 is fed axially of the workpiece 19 through its maximum stroke.

Figure 14:
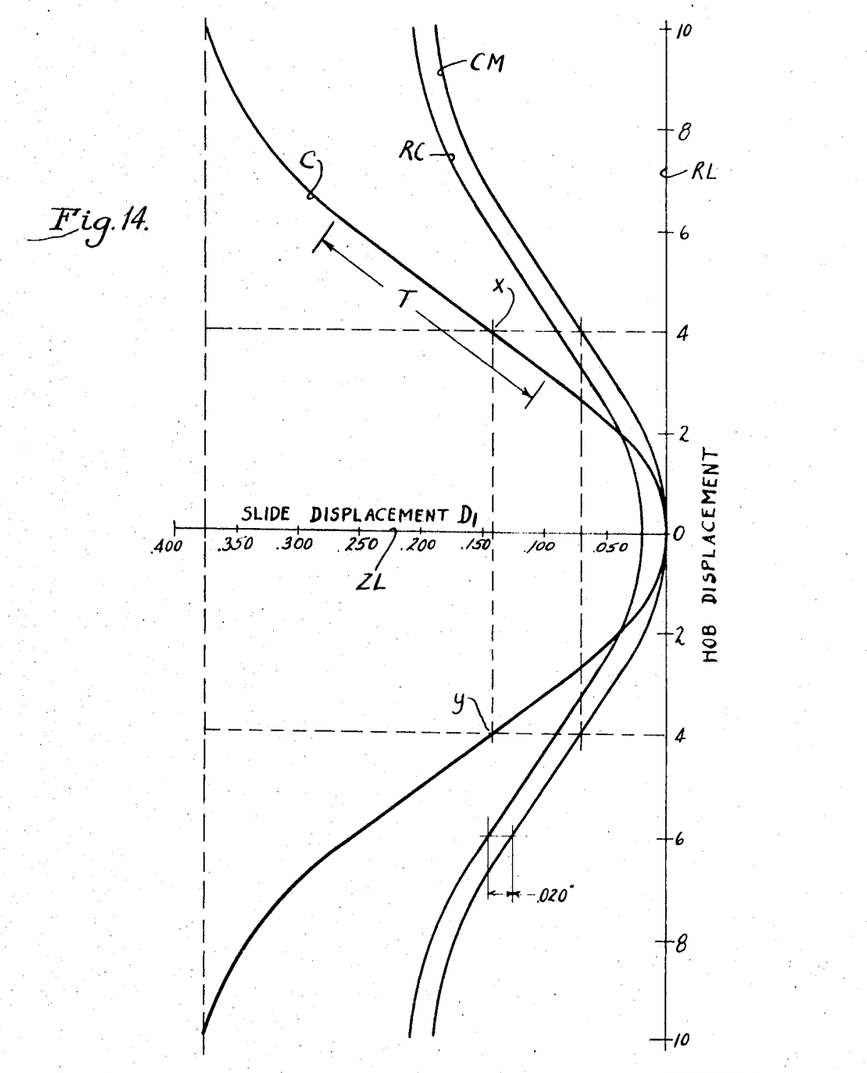
FIG. 14 is a graph having a series of curves illustrating the relative positions of the hob and the workpiece during the cutting of gears with special tooth forms.

Let it be assumed that the work slide 24 has been advanced toward the hob 21 through its full stroke of 3″ by the actuator 84, so that the core 135 of the slave transformer 131 has been displaced by the arm 100 through a distance $D_1$ of ⅜″ from the reference line RL. Let it further be assumed that the hob is at the extreme upper limit of its stroke, and that the cam 154 has been adjusted on the cam shaft 155 in such a position that the follower 165 is riding against the low point LP on the cam (FIG. 9) with the high point HP thus being spaced 180 degrees from the follower. The core 142 of the master transformer 130 thus is displaced through a distance $D_2$ which also is ⅜″. Finally, assume that the total stroke of the hob is to be 20″, i.e., 10″ above and 10″ below a zero reference line ZL or X axis of a graph (FIG. 14) which illustrates the displacement $D_1$ undertaken by the work slide 24 during downward movement of the hob.

Now, the command voltage $e_c$ from the master transformer 130 will vary as the distance $D_2$ changes, according to the linear relation:

$$e_c = kE_sD_2 \qquad (1)$$

where:

$k$ = a constant of proportionality
$E_s$ = the source voltage
$D_2$ = the displacement of the master core 142 by the cam 154, and is a function of the position of the hob 21.

The feedback voltage $e_f$ produced across the secondaries 134 of the slave transformer 131 may be expressed as:

$$e_f = kE_sD_1 \qquad (2)$$

where:

$D_1$ = the displacement of the slave core 135 and the slide 24 from the reference line RL.

Since the secondaries 134, 141 of the two transformers are connected in series opposing relation through the resistor $R_1$, the output voltage from one transformer subtracts from the output voltage from the other transformer. The error voltage $e_e$ produced across the resistor $R_1$ thus is:

$$e_e = e_c - e_f \qquad (3)$$

By substituting into Equation 3 the values of $e_c$ and $e_f$ from Equations 1 and 2, the error voltage $e_e$ may be rewritten as follows:

$$e_e = kE_sD_2 - kE_sD_1 \qquad (4)$$

and, by replacing the constant value $kE_s$ with a composite constant K, the error voltage $e_e$ may be expressed in simplified form as:

$$e_e = K(D_2 - D_1) \qquad (5)$$

Now, the output voltage $e_o$ of the amplifier 147 may be represented by the equation:

$$e_o = Ge_i \qquad (6)$$

where:

G = the gain factor of the amplifier
$e_i$ = the input voltage to the amplifier

But (with the wiper 176 of a potentiometer 178 at its left limit, as shown in FIG. 9) the input voltage $e_i$ is normally equal to the error voltage $e_e$, so substitution of the value of $e_e$ found in Equation 5 for the value of $e_i$ in Equation 6 yields:

$$e_o = GK(D_2 - D_1) \qquad (7)$$

Accordingly, with the work slide 24 in its fully advanced position and with the hob 21 in its extreme upper position as assumed above, both the core 135 of the slave transformer 131 and the core 142 of the master transformer 130 are displaced through distances $D_1$ and $D_2$, respectively, which are each equal to ⅜″. Thus, the quantity $GK(D_2 - D_1)$ is zero, and the signal $e_o$ therefore is zero. In consequence, as long as the hob and the slide remain in their upper and advanced positions, respectively, no signal will be supplied to the torque motor 123, the spool 117 of the servo-valve 123 will remain in its centered position, and the slide 24 will remain at rest.

As the hob 21 starts moving downwardly, the cam 154 begins to rotate to force the master core 142 away from the cam shaft 155 and decrease the displacement $D_2$ of the core. The voltage $e_c$ thus decreases, and the error signal $e_e$ across the resistor $R_1$ takes on a small but finite value since the displacement $D_1$ of the slave core 135 and the voltage $e_f$ momentarily remain at their initial values. It may be assumed arbitrarily that the voltage $e_e$ under these conditions is in phase with the source voltage $E_s$. The error signal $e_e$ is supplied to the torque motor 123 via the lines 151 as the signal $e_o$ (assumed to be of positive polarity), and the torque motor urges the spool 117 of the servo-valve 115 to the left by an amount proportional to the magnitude of the signal $e_o$ to admit pressure fluid into the left end of the cylinder 86. The slide 24 thus is retracted away from its advanced position to decrease the displacement $D_1$ of the slide from the reference line RL to a value equal to the displacement $D_2$ commanded by the master transformer 130, so that the error voltage tends to go to zero. With continued downward movement of the hob, the displacement $D_2$ of the master core 142 progressively decreases in response to rotation of the cam, and the slide accordingly is retracted to make the displacement $D_1$ agree with the commanded displacement $D_2$. The position of the slide corresponding to any given position of the hob is represented by the curve C (FIG. 14) and the position of the slide thus varies as a non-linear function of the hob displacement.

Retraction of the slide 24 continues until the hob 21 reaches the midway point or zero reference line ZL of its downward stroke. At this time, the cam 154 has been turned through an angle of 180 degrees from its initial position, and the follower 165 is now riding against the high point HP of the cam (see FIG. 12). Accordingly, the displacement $D_2$ of the master core 142 has decreased from its initial value of $\frac{3}{8}''$ to a value of zero. The voltage $e_c$ thus is reduced to zero. At essentially the same instant the hob reaches the midway point of its stroke, the slide reaches a position displaced $\frac{3}{8}''$ from its initial advanced position. Thus, the distance $D_1$ and the feedback voltage $e_f$ are reduced to zero.

Thereafter, the hob 21 moves downwardly through the lower half of its stroke (i.e., below the zero reference line ZL), and the cam 154 starts turning through its final 180 degrees. The high point HP of the cam thus rotates away from the follower 165 to allow the master core 142 to shift toward the shaft 155, so that the displacement $D_2$ increases, thereby increasing the voltage $e_c$. The error signal $e_e$ again will become finite but will be out of phase with the source voltage $E_s$, because the voltage $e_c$ is greater than the voltage $e_f$. The output voltage $e_o$ will thus be of negative polarity, and the torque motor 123 will thus shift the spool 117 of the servo-valve 115 to the right, admitting pressure fluid into the right end of the cylinder 86 to advance the work slide 24 toward the hob, so as to make the displacement $D_1$ of the slide agree with the displacement $D_2$ commanded by the cam. Advancement of the slide will continue until the hob completes its downward stroke and the master core 142 is displaced through a distance $D_2$ of $\frac{3}{8}''$. At this time, the slide will have reached in its original or fully advanced position and the distance $D_1$ from the refernce line RL will also be $\frac{3}{8}''$. In consequence, both the command voltage $e_c$ and the feedback voltage $e_f$ will be of equal magnitude, and no further displacement of the slide will occur.

With the foregoing arrangement, the slide 24 and the workpiece 19 are retracted a predetermined distance $D_1$ away from the hob until the latter reaches the midpoint of its stroke, and then are advanced through a corresponding distance toward the hob during movement of the hob through the lower half of its stroke. The movement of the slide relative to changes in position of the hob is defined by the curve C. Accordingly, it will be apparent that, by feeding the workpiece radially in accordance with the curve C as the teeth 17 are being cut by the hob, the depth of cut of the hob into the workpiece will first be reduced and then increased so that the teeth will be formed with crowned sides (shown at 110 in FIG. 3) which are similar in shape to the curve. By adjusting the cam 154 to command that the displacement $D_1$ of the slide be zero when the axis of the hob is alined horizontally with the vertical center of the workpiece, the high points 111 of the crowns will be located at the vertical centers of the teeth and, as a result, the teeth will be symmetrically curved about their centers.

Exemplary procedure for cutting a gear with special tooth forms

It will be appropriate now to consider an exemplary procedure which may be followed in forming a gear 16 with crowned teeth 17. Before actually cutting the teeth, it is necessary to make various preliminary adjustments to the machine to establish the proper depth of cut of the hob 21 into the workpiece 19 and to insure that the high points 111 of the ultimate crowns will be located exactly at the vertical centers of the sides of the teeth. Accordingly, with the work slide 24 retracted by the actuator 84 and after a workpiece of desired diameter and height has been clamped to the work spindle 20, the work slide is adjusted rearwardly along the piston rod 83 by the operating screw 105 so that, when the slide is subsequently stopped at the inward position, the periphery of the workpiece will be some distance short of the vertical path followed by the periphery of the hob during its downward stroke.

The hob 21 then is shifted downwardly toward the workpiece 19 (by manual control means, not shown, for the motor 60) until the axis 23 of the hob is alined horizontally with the vertical center of the workpiece, i.e., until the axis of the hob is disposed in a plane extending through the vertical center of the workpiece and perpendicular to the axis thereof. With the hob thus positioned, the set screw 160 (FIG. 6) is loosened and the cam 154 is turned on the cam shaft 155 until the high point HP of the cam is disposed directly against the follower 165 of the master transformer 130. Since the vertical center of the workpiece will usually not be positioned at the exact midpoint of the stroke of the hob, such adjustment of the cam must be made to insure that the displacement $D_1$ and $D_2$ and the voltages $e_f$ and $e_c$ will all be zero and that the workpiece will be properly positioned when the axis of the hob is again horizontally alined with the vertical center of the workpiece during the subsequent cutting stroke of the hob. During adjustment of the cam position, a manually operable set up switch used only for set up purposes and consisting of two contacts SS1a and SS1b (FIG. 9) in lines 144 and $L_4$, respectively, is positioned to open contacts SS1a and to close contacts SS1b. As a result, both transformers 130 and 131 are excited at source voltage $E_s$ and will produce outputs $e_c$ and $e_f$. However, a voltmeter V (FIG. 9) connected across the output terminals of the master transformer 130 will indicate the magnitude of voltage $e_c$ only. Thus, a sensitive visual means is available to indicate when the cam 154 has been adjusted with the high point HP disposed exactly against the follower 165 since the voltage $e_c$ will go to zero when the cam is so adjusted.

After the cam has been adjusted, the set up switch is manually positioned to close contacts SS1a and open contacts SS1b. Thereafter, the work slide 24 is traversed rapidly toward the hob 21. Such traversing of the slide is achieved through manual closure of the pushbutton switch FS (FIG. 8) to energize the forward traverse solenoid FT which shifts the spool 93a of the traverse valve 93 (FIG. 7) to a position admitting pressure fluid into the right end of the cylinder 88 of the actuator 84. In the present instance, it may be assumed that the wedge 99 (FIG. 9) is positioned to engage the dog 98 and stop further forward traversing of the slide upon advancement of the latter through its full 3" stroke. The workpiece 19 will stop short of the hob 21 as a result of the previous adjustment effected by the operating screw 105.

During the last $\frac{3}{8}''$ of the forward traverse stroke of the slide 24, the arm 100 abuts the extension 136 on the core 135 of the slave transformer 131 to displace the core $\frac{3}{8}''$ from its null position, so that the transformer will produce an output voltage $e_f$ indicating that the slide has been displaced through a distance $D_1$ of $\frac{3}{8}''$ from the reference line RL. As the slide is stopped by engagement of the dog 98 with the wedge 99, the limit switch LS1 is actuated and opens the switch contacts LS1a (FIG. 8) to de-energize the forward traverse solenoid FT, thus terminating the flow of pressure fluid to the cylinder 86 through the valve. Actuation of the limit switch also closes normally open switch contacts LS1b, and closure of these contacts energizes a relay C1 which closes normally open sealing contacts C1a to establish a holding circuit maintaining the relay energized independently of the condition of the contacts LS1b. In addition, the relay closes contacts C1b (FIG. 9) in the line $L_4$ to excite the transformers 130 and 131 with the source voltage $E_s$.

Since the cam 154 is positioned at the high point HP, the displacement $D_2$ is zero. Thus, an error signal $e_e$ is produced and is supplied to the torque motor 123 as the signal $e_o$ to cause shifting of the valve spool 117 and retraction of the work slide 24. During such retraction, the dog 98 moves away from the limit switch LS1 to open the switch contacts LS1b. The relay C1, however, remains energized by the holding circuit set up through the contacts C1a, and thus the contacts C1b in the line $L_4$ are held closed to maintain the transformers excited. Control of the actuator 84 thus is retained by the master transformer 130 and the servo-valve 115. As soon as the slide 24 has been retracted through ⅜″, the displacement $D_1$ and the feedback voltage $e_f$ also become zero, causing the slide to stop. At this time, the work slide 24 will be under servo control and both transformer cores 142 and 135 will be at their respective null positions. This is the condition which must prevail at the time the hob 21 is cutting the workpiece 19 at the vertical center.

Next, the machine operator turns the handle 104 of the manual adjusting screw 105 to advance the slide 24 along the piston rod 83 and toward the hob 21 until the periphery of the workpiece just touches the periphery of the hob. The position of the slide relative to the rod is then read on an accurately calibrated dial 169 (FIG. 1) associated with the adjusting screw. Such adjustment of the slide by the screw 105 is independent of the servo system and thus does not disturb the latter.

The machine operator operator next depresses the push button switch RS (FIG. 8) to close contacts RS1 and energize the reverse traverse solenoid RT. Accordingly, oil flows through the rapid traverse valve 93 and into the left end of the actuator cylinder 84 to retract the work slide 24 rapidly through the remaining 2⅝″ of its full stroke. Depression of the switch RS1 also opens switch contacts RS2 to drop out the relay C1. The relay thus opens the contacts C1b in the line $L_4$ to disable the transformers 130, 131 and the servo-valve 115 during the rapid return of the slide. In addition, the relay opens the sealing contacts C1a preparatory to the next cycle of operation.

With the workpiece 19 fully retracted, the adjusting screw 105 is once again turned to advance the slide 24 along the piston rod 83 and toward the hob 21 through a predetermined distance in order to establish the desired depth to which the hot is to cut into the workpiece to form the teeth 17. In other words, the workpiece is shifted relaive to the piston rod 83 so that, when the workpiece is again advanced by the actuator 84 until the stops 98, 99 engage, the periphery of the workpiece will project some predetermined distance into the path of movement of the hob. When the hot is thereafter advanced downwardly, its periphery will cut into the workpiece to a predetermined depth instead of simply touching the periphery of the workpiece. Since, by reading the dial 169, the operator previously determined the position of the workpiece when the latter was just contacting the periphery of the hob, the tooth depth adjustment may be effeced simply by turning he adjusting screw 105 until the dial indicates that the workpiece has moved to the left through a distance equal to the required tooth deph.

Finally, the hob 21 is retracted to its uppermost position by manual control of the hydraulic motor 60 and, during such movement, the cam 154 is rotated counter-clockwise to displace the master core 142 through a distance $D_2$ of ⅜″. Since the contacts C1b are open, however, no command voltage $e_c$ is produced at this time in spite of the displacement of the master core.

The machine is now ready for automatic operation. Let it be assumed as an extreme example useful for purposes of discussion that the workpiece 19 is 8″ in height and that it is desired to form the teeth with a crown of magnitude $a$ (FIG. 3) requiring a work slide displacement of .140″. The magnitude of the crown is defined as the distance between the high point 111 of the side 110 of each tooth 17 and a low point 111b located at one extremity of the tooth. Solely for simplicity of description, let it be assumed that the vertical center of the workpiece 19 is in fact located at the midway point (i.e., the zero reference line ZL) of the downward stroke of the hob.

Figure 10:
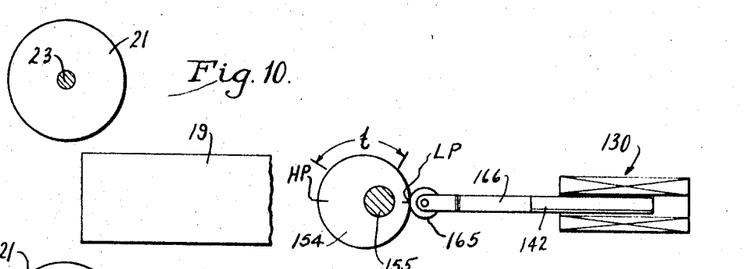
FIGS. 10 to 13 are schematic views showing the relative positions of the hob, the workpiece, and the command element during the successive steps of hobbing a gear with crowned teeth.

Now, with the hob 21 retracted to its uppermost position and with the workpiece 19 retracted to its rearwardmost position, the machine operator starts the motor 31 to rotationally drive those elements, and depresses the push button switch FS to traverse the workpiece forwardly. During the final ⅜″ of the traverse stroke, the arm 100 picks up the slave core 135 and displaces the latter through a distance $D_1$ of ⅜″. Upon completion of the 3″ traverse stroke, the dog 98 engages the limit switch LS1; the contacts LS1a (FIG. 8) open to de-energize the solenoid FT; the contacts LS1b close to energize the relay C1 which seals in through contacts C1a; and the contacts C1b (FIG. 9) close to excite the transformers 130, 131. The slide 24 stops with the workpiece projecting into the path of the hob as shown in FIG. 10. Both cores 135 and 142 are displaced through ⅜″, and thus no error voltage $e_e$ is produced so the workpiece remains stationary.

Next, the hydraulic motor 60 is started to feed the hob 21 downwardly. As the hob approaches and starts cutting into the workpiece 19, the cam 154 rotates to decrease the displacement $D_2$ of the master core 142, so that a voltage $e_c$ is produced. Accordingly, as the position of the hob changes, the workpiece is retracted away from the hob in accordance with the upper half of the curve C.

Figures 11, 12:
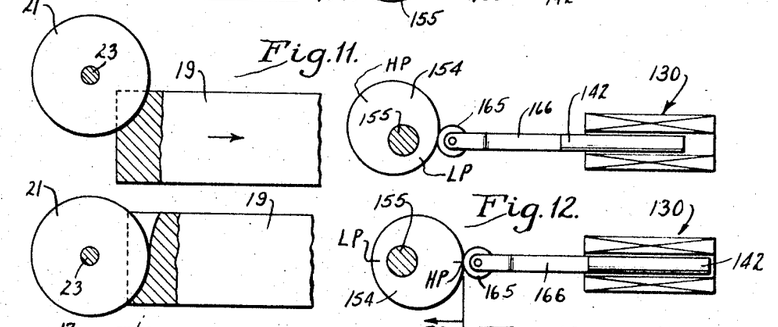

When the axis of the hob 21 is just a short distance above the upper face of the workpiece 19 as shown in FIG. 11, the hob teeth start taking a "full cut" from the workpiece and crowning of the finish portion of the gear teeth 17 is begun. At this time, the hob has advanced downwardly 6″ from its upper position and, from the curve C, it will be seen that the workpiece has been retracted to point X and that the displacement $D_1$ of the slide 24 from the reference line RL is now only .140″. As the hob continues to move downwardly, the workpiece is retracted to gradually reduce the depth of cut until the axis of the hob is alined with the vertical center of the workpiece (FIG. 12) and the displacements $D_1$ and $D_2$ both go to zero. Thus, from the time the hob started its "full cut" to form the crowns (FIG. 11) until the time the hob became alined with the vertical center of the workpiece (FIG. 12), the latter was retracted through a distance of .140″ and the depth of cut was correspondingly reduced. Accordingly, the upper half of the side 110 of each tooth 17 is formed with a crown of magnitude $a$ resulting from and proportional to a work slide displacement of .140″.

As the axis of the hob 21 passes the vertical center of the workpiece 19, the high point HP of the cam 154 rotates past the follower 165 to increase the displacement $D_2$ and the voltage $e_c$. As a result, the workpiece starts advancing toward the hob and the depth of cut is gradually increased to cut the lower halves of the teeth with progressively less width. When the axis of the hob is just a short distance below the lower face of the workpiece (FIG. 13), the teeth 17 are completely formed, and no additional metal is removed from the workpiece during the remainder of the downward stroke of the hob. At this time, the workpiece has been advanced to point Y on the curve C and has been advanced through a distance $D_1$ of .140″. Thus, the lower halves of the teeth are also formed with a crown of magnitude $a$.

After the teeth 17 have been formed, the operator may retract the workpiece 19 rapidly by depressing the push button RS (FIG. 8), and may return the hob 21 to its upper position by manual control of the hydraulic motor 60. A new workpiece may be clamped to the work spindle 20, or the previously formed gear may be left on the spindle and the cutting cycle repeated so that a fine finishing cut can be made to remove only a small amount of metal from the teeth. If the operator should find that the teeth of the newly formed gear or of the next succeeding gear need to be slightly deeper, the adjusting screw 105 may be turned to advance the work slide 24 along the piston rod 83 and toward the hob to increase the depth of cut. Advantageously, such adjustment of the slide along the piston rod does not affect the magnitude of the crowns formed on the teeth since the arm 100 remains stationary and does not disturb the position of the slave core 135 relative to the master core 142. Thus, a workpiece displacement of .140″ in each direction will still exist during the time the hob is effectively cutting the teeth and, as a result, crowns of magnitude $a$ will still be formed regardless of the depth of the teeth being generated.

Usually, it is desirable to form the gear 16 in the shortest feasible time in order to increase the output capacity of the machine. After initially setting up the machine, the operator may reduce the cycle time by retracting the hob 21 upwardly to a starting position in which the lower periphery of the hob is just above the upper face of the workpiece 19. The hob therefore need not be moved downwardly through such a long distance before engaging the workpiece, and the amount of time that the hob simply "cuts air" is reduced. In addition, by adjusting the screw 102, the operator may lower the wedge 99 into a position in which it engages the dog 98 after the arm 100 has displaced the slave core 135 only through a distance $D_1$ of, for example, .160″ which is just slightly greater than the displacement necessary for the magnitude of the crown to be formed. Since the workpiece need only be retracted and advanced through a .140″ stroke to form a crown of magnitude $a$, it is not essential that the workpiece be retracted and advanced through the full ⅜″ radial feed capacity of the machine.

Figure 4:
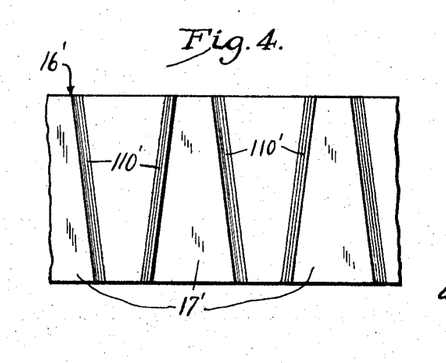
FIG. 4 is similar to FIG. 3 but shows a gear having longitudinally tapered teeth.

In order to form the gear 16′ (FIG. 4) with the tapered teeth 17′, it is necessary only to loosen the set screw 160 (FIG. 6) and turn the cam 154 on the cam shaft 155 to a position in which only a selected portion of the cam periphery rotates past the master core follower 165 during the entire cutting stroke of the hob. That is, by adjusting the cam clockwise (FIG. 10) on the shaft 155 so that, during the cutting stroke of the hob, the follower rides over only an arc $t$ (for example, 95°) of the cam located midway between the high point HP and the low point LP, the master core 142 will be displaced in only one direction (i.e., away from the shaft 155) by a comparatively flat portion of the periphery of the cam and will command only a gradual retraction of the workpiece 19 as the hob moves downwardly. The slide will thus move in accordance with a relatively straight length T (FIG. 14) of the curve C and, as a result, the depth of cut of the hob will be progressively reduced as the hob cuts from the upper face of the workpiece to the lower face thereof. This results in the formation of teeth having inclined sides which gradually taper away from each other as illustrated in FIG. 4.

It will be apparent that both crowned and tapered teeth may be generated with the same cam 154 simply by adjusting the angular position of the cam on the shaft 155 and by using different selected lengths of the periphery of the cam to command the displacement of the slide 24. The cam thus is extremely versatile and yet, since it is simply an eccentrically mounted circular disk, it may be manufactured very inexpensively and without being cut with a complex or intricate shape. It should be realized, however, that the radial feed system of the machine could be used equally well for generating other types of special tooth forms, such as teeth with chamfered or rounded ends, by replacing the eccentric cam 154 with one formed with suitably located rises, falls and dwells effective to command movement of the slide 24 in a pattern necessary to generate the desired tooth form.

Changing the magnitude of the tooth form

In accordance with an important feature of the invention, provision is made for changing the magnitude of crowning given to any gear during the hobbing operation without first changing the cam 154 and repeating the entire set-up procedure. For this purpose, means are provided for adjusting the command signal $e_c$ so that it takes on any desired fraction of its normal magnitude over its entire range of variation. This is achieved with an extremely simple electrical control 170 (FIG. 9) with which the operator may, in effect, dial in the desired magnitude of the crown without making complicated mechanical adjustments to the machine.

The exemplary control 170 shown in FIG. 9 comprises a resistance potentiometer energized by the voltage $E_s$ from the lines $L_3$, $L_4$ (when contacts C1$b$ are closed) and arranged to excite the primary winding 140 of the master transformer 130 with any desired fraction of the source voltage. For this purpose, one end of the winding 140 is connected to an extremity of the resistance 170 and the opposite end is connected to a wiper 172 slidable to any selected position along the resistance. Thus, movement of the wiper to different positions along the resistor causes the primary winding 140 of the master transformer to be supplied with different fractional values of the source voltage $E_s$, but does not affect the magnitude of the slave transformer exciting voltage. An adjusting knob 174 is connected to move the wiper along the resistor and is associated with a calibrated dial by which the setting of the wiper and the value of the voltage supplied to the master transformer can be determined.

When the wiper 172 is set along the resistance 170 in a "1" position as shown in FIG. 9, the voltage applied to the primary winding 140 of the master transformer 130 is equal to the full value of the source voltage $E_s$, and operation proceeds as described above. As the wiper is adjusted to the left along the resistance, the voltage supplied to the primary winding 140 is decreased relative to the value of the voltage $E_s$. Accordingly, the command voltage $e_c$ produced by the master transformer (for any position of the core 142) is less. The relationship of the voltage $e_c$ to the displacement $D_2$ as the wiper 172 is given any setting may be expressed:

$$e_c = kpE_s D_2 \qquad (8)$$

where:

$k$, $E_s$, $D_2$ represent the same factors as in Equation 1, and $p$ = a fraction depending upon the setting of the wiper 172 and adjustable from one to zero.

Therefore, by substituting the value of the command voltage $e_c$ from Equation 8 into Equations 4 and 5, the error voltage $e_e$ becomes:

$$e_e = kpE_s D_2 - k E_s D_1$$
$$e_e = K(pD_2 - D_1) \qquad (9)$$

and, the amplifier output voltage $e_o$ which is supplied to the torque motor 123 now may be expressed as:

$$e_o = GK(pD_2 - D_1) \qquad (10)$$

Now, the torque motor 123 will shift the spool 117 of the servo-valve 115 away from its centered position if $e_o$ is not zero, so the torque motor and the servo-valve operate to keep the work slide 24 positioned such that the value of $e_o$ is substantially zero. This means that, for practical purposes and except for dynamic error, the quantity $GK(pD_2-D_1)$ is always zero. Therefore, the relationship of the displacement $D_1$ actually undertaken by the work slide 24 to displacement $D_2$ commanded by the cam 154 may be represented by the equation:

$$GK(pD_2-D_1)=0$$
$$D_1=pD_2 \quad\quad (11)$$

When cutting a gear 8″ in height and having teeth 17 formed with a crown of magnitude $a$ produced by a slide displacement of .140″, as in the former example, the wiper 172 is positioned as shown in FIG. 9 such that the fraction $p$ is 1.0. The magnitude of the signal $e_o$ supplied to the torque motor 123 therefor is simply equal to the quantity $GK(D_2-D_1)$ as set forth in Equation 7. Accordingly, each increment $D_2$ through which the cam 154 displaces the master core 142 causes movement of the work slide 24 through an equal increment $D_1$, so that movement of the slide is governed by the curve C with a displacement of .140″ in each direction and results in the formation of a crown with a magnitude $a$.

But if it is desired to form a workpiece 19 of the same 8″ height with teeth 17 of the same depth as before but with a shallower crown of smaller magnitude, the operator need only set the wiper 172 at a different position along the resistance 170 to decrease the value of the fraction $p$ and thereby reduce the voltage applied to the primary 140 of the master transformer 130 to a selected fraction of the full value of the source voltage $E_s$.

Let it be assumed that the operator has set the wiper 172 in a "0.5" position to dial in a value $p$ of 0.5. The command voltage $e_c$ thus becomes equal to one-half of its normal value, for any displacement $D_2$ of the core 142, and the relationship of the displacement $D_1$ undertaken by the work slide 24 to the displacement $D_2$ commanded by the cam 154 becomes:

$$D_1=0.5D_2$$

Accordingly, each increment of displacement commanded by the cam results in movement of the slide through an increment only one half as great as that mechanically commanded. Thus, instead of following the curve C. the slide will move in accordance with a flatter curve CM which, at any given point from the reference line RL, represents a displacement just half as large as the curve C. With the slide 24 being retracted and advanced as governed by the curve CM, the magnitude of a crown formed on an 8″ workpiece thus becomes just one half as great as the former magnitude $a$ developed by a slide displacement of .140″. Simply by changing the position of the wiper 172, the factor $p$ can be set at .25, .75 or any other fractional value and, depending upon the setting, the slide will follow different ones of a family of curves CM′ shown in FIG. 15 so that the magnitude of the crown may be changed within an extremely wide range.

Regardless of the magnitude of the crown, however, the distance $d$ (FIG. 3) between the high points 111 on the opposite sides of each tooth 17 remains the same. That is to say, only the slope of the crown is changed, and the maximum thickness $d$ of each tooth 17 has the same value whether the tooth is formed with a very deep crown or with a very shallow crown. This results from the fact that only the ratio of the movement of the slide 24 to the movement of the hob 21 is changed by adjusting the position of the wiper 172 to vary the fraction $p$. Irrespective of the setting of the wiper, retraction of the side is stopped when its displacement $D_1$ from the reference line RL is zero and when the axis of the hob is positioned at the zero reference line ZL. Accordingly, the high point 111 of each crown remains in the same relative location even through the magnitude of the crown is changed It will be apparent from the foregoing that crowns of various magnitudes may be formed with only a single cam 154 simply by dialing in a different setting of the wiper 172 to make the command voltage $e_c$ have different fractional values of its normal magnitude. The range through which the magnitude of the crowns may be varied is limited only by the sensitivity and range of adjustment of the resistance 170. It will also be appreciated that, when cutting tapered gears, the degree of taper with which the tapered teeth 17′ are formed may be similarly varied within a wide range by changing the setting of the wiper.

Double-cut cycle

In many instances, it is desirable to employ a "double-cut" cycle by which crowns are actually formed on the teeth 17 during a rough cutting cycle of the hob 21, but a small predetermined amount of "finishing" stock is left remaining on the teeth for removal during the fine or finish cutting cycle of the hob. To simplify the performance of a double-cut cycle, the present invention contemplates the provision of means for selectively creating an auxiliary offset signal $e_a$ (FIG. 9) which is preferably but not necessarily combined with the error signal $e_e$ to "hold back" movement of the slide 24 by a predetermined amount as the hob makes a roughing cut so that a selected amount of stock will be left on the sides of the teeth for removal during the finishing cut. The magnitude of the offset signal $e_a$ may be simply and accurately "dialed-in," thus making it unnecessary to make any mechanical adjustments to the machine between the rough and finish cutting cycles.

To create the offset signal $e_a$, the source voltage $E_s$ is connected from lines $L_3$ and $L_4$ (FIG. 9) across a potentiometer 178, and any selected fraction of the source voltage depending upon the setting of a wiper 176 is thus injected between terminals 148a, 148b which lie in the series path for transmitting the error voltage $e_e$ to the input of the amplifier 147. A voltage $e_a$ thus is combined with the error signal $e_e$ created across the resistor $R_1$, so that the value of the input voltage $e_i$ to the amplifier is equal to the algebraic sum of the voltages $e_e$ and $e_a$. An adjusting knob 180 is connected to move the wiper 176 along the potentiometer 178 and is associated with a calibrated dial which enables the setting of the wiper to be determined conveniently and accurately. As the wiper 176 is moved progressively to the right from its extreme left position shown in FIG. 9, the magnitude of the offset voltage $e_a$ increases from zero to a value proportional to the adjusted wiper position.

With this arrangement, the value of the input voltage $e_i$ to the amplifier 147, instead of simply being equal to the error signal $e_e$, is equal to the algebric sum of the error signal and the offset signal $e_a$. Thus:

$$e_i=e_e+e_a \quad\quad (12)$$

And, substituting into Equation (12) the value of $e_e$ defined by Equation 9 results in the voltage $e_i$ being represented by the equation:

$$e_i=K(pD_2-D_1)+e_a \quad\quad (13)$$

So, therefore, the amplifier output voltage $e_o$ which is supplied to the torque motor 123 may be expressed as:

$$e_o=G[K(pD_2-D_1)+e_a] \quad\quad (14)$$

And, since the quantity $e_o$ is, for purposes of discussion, kept alway equal to zero by the servo system, Equation 14 may be simplified and rewritten to give the relation:

$$KpD_2=KD_1-e_a \quad\quad (15)$$

It will thus be apparent that each increment of displacement $D_2$ of the master core 142 as commanded by the cam 154 will result in the work slide 24 being moved through an increment $D_1$ which may be only a fraction of that commanded (as determined by the value of the factor $p$) and which is additionally held back by amount proportional to the magnitude of the offset signal $e_a$. When the values of both $p$ and $e_a$ are zero, the displacement of the slide will follow the curve C. If the value of $p$ is 0.5 and the value of $e_a$ is zero, the slide will be advanced and retracted in accordance with the curve CM. In either of these instances, when the value of the voltage $e_a$ is set at a finite value, the movement of the slide will be governed by a curve which extends parallel to one of the curves C or CM but which is offset from such curve by an amount proportional to the voltage $e_a$. Accordingly, by adjusting the wiper 176 to create a predetermined offset voltage $e_a$ across the terminals 148a and 148b, the ratio of the displacement of the slide 24 to the downward movement of the hob 21 will be the same as that which would otherwise result in the absence of the voltage $e_a$, but the slide will be "held back" in an amount proportional to the voltage $e_a$, so that the ultimate depth of cut of the hob into the workpiece will be reduced by a corresponding amount. Thus, rough cutting of the gear teeth 17 may be performed with an offset voltage $e_a$ being impressed upon the error signal $e_e$, thereby to crown and form the teeth while leaving a predetermined amount of stock remaining for removal during the finishing cut. The offset voltage $e_a$ then may be reduced to zero, and the finishing cut may be taken to remove the remaining stock and form the gear teeth to their final depth.

To demonstrate the simplicity with which a double-cut cycle may be performed by regulating the offset voltage $e_a$, let it be assumed that it is desired to form teeth 17 with crowns requiring a .070" work slide displacement on a workpiece 19 which is 8" in height. Let it further be assumed that it is desired to rough cut to within .020" of the final depth of the teeth, thereby to leave .020" of metal remaining on the teeth for removal during the finishing cut.

First, the operator sets the wiper 172 in the "0.5" position in order to direct movement of the slide 24 in accordance with the curve CM, so that the commanded displacement $D_1$ of the slide will be .070" in each direction during the effective cutting stroke of the hob 21. Thereafter, the operator simply dials the wiper 176 to a setting in which the value of the offset voltage $e_a$ is sufficient to hold back movement of the slide by .020". The rought cut is then made by the procedure described in detail above. Because of the offset signal, the slide, rather than following the curve CM during the cutting stroke of the hob, follows a rough cut curve RC which extends parallel to but which is offset from the curve CM by a distance of .020". Accordingly, the slide is displaced in each direction through the same distance $D_1$ of .070", but it is held out from the hob by the required .020" during the entire process of rough cutting the teeth 17. The teeth, thus formed, have the same crown as that required on the finish cut, therefore, the amount of material to be removed during finishing is uniform, which is conducive to accuracy, particularly when the crowns are large. Of course, if it is desired to leave either a larger or smaller amount of finishing stock on the teeth, the wiper 176 may be dialed to a different adjusted position to cause the slide to follow a different one of a family of parallel curves RC′ (FIG. 16) and thereby hold back the workpiece by a different amount.

After the rough cutting cycle has been completed, the wiper 176 is set along the resistor 178 to a position in which the offset voltage $e_a$ is zero. Thus, when the finishing cut is taken, the workpiece 19 will be displaced strictly in accordance with the curve CM, and the remaining .020" of metal will be removed from the teeth to leave the latter formed with finished crowns of the desired magnitude.

Accordingly, without making any mechanical adjustments to the machine between cycles, a double-cut operation can be performed with crowning of the teeth being effected during both the rough and finish cuts. In addition to simplifying the manual operations required between the cutting cycles, the use of the offset voltage $e_a$ improves the accuracy in which the teeth may be formed since the amount of stock to be left for the finishing cut may be very precisely established by adjusting the value of the voltage $e_a$.

Controlled radial feed without axial feed

Although the radial feed system of the present invention has thus far been described specifically in conjunction with the generation of special gear tooth forms, it should be realized that the system is equally applicable to other operations. For example, when cutting enveloping gear forms such as worm gears, the workpiece is fed unidirectionally along its radius into the hob 21 while the latter is simply rotated in a fixed vertical position opposite the periphery of the workpiece. With the present system, enveloping gear forms may be cut by adjusting the cam 154 on the cam shaft 155 to such a position that a relatively "flat" portion of the periphery of the cam displaces the core 142 of the master transformer 130 to command only a gradual advancement of the slide 24 toward the hob 21. An axial drive clutch 182 (FIG. 5) coupled into the axial drive shaft 61 is then disengaged to disconnect the lead screw 65 of the hob carriage 27 from the hydraulic motor 60 and thereby prevent axial feeding of the hob when the motor is in operation. The motor, however, continues to rotate the cam 154 through the shaft 61 and the gearing 157, 163 and 164, and the cam thus may command displacement of the core 142 and advancement of the slide to feed the workpiece radially into the hob. The movement of the workpiece may be precisely controlled by the setting of the wipers 172 and 176, and the final position to which the workpiece is advanced may be established either by adjusting the position of the wedge 99 or by withdrawing the wedge from the path of the dog 98 and allowing the piston 85 simply to "bottom" against the forward end of the cylinder 86.

A drum (not shown) may be attached to the cam shaft 155 for mounting two independently adjustable limit switch trip dogs. Each dog is arranged to actuate a limit switch for control of the angular position of the cam, one for the clockwise position and one for the counterclockwise position. These dogs and their respective switches are used in an automatic cycle to control the cam stopping position upon completion of radial feed and the position at which the cam must stop after rapidly returning to its initial position in preparation for a subsequent radial feed cycle.

Accordingly, by commanding displacement of the slide 24 with a rotatable cam 154 which may be driven independently of the feed of the hob 21, the system is effective to feed the workpiece 19 radially at a controlled rate even while the hob is being held in a fixed vertical position and is not moving axially of the workpiece.

Plunge approach

In addition, the radial feed system may be employed to advantage when a so-called "plunge approach" is desired. In this type of operation, the workpiece is fed radially into the rotating hob during the initial portion of the cut to a predetermined depth before the hob is fed axially of the workpiece. By using the plunge approach, the hob may be initially positioned with its axis just above the upper face of the workpiece, and thus need not be moved downwardly into engagement with the workpiece to start the cut. As a result, the hob and the workpiece may be moved into cutting engagement through radial feeding of the workpiece even though the workpiece may be formed with a large overhanging shoulder which projects into the path of the hob and which otherwise would preclude such engagement without radial feeding. Again, by commanding the radial feed of the workpiece by a cam which may be driven independently of movement of the hob, the radial feed necessary for a plunge approach may be produced while the hob is disposed in a fixed position.

Plunge approach proceeds as described above when cutting spur gears because the differential change gears 76 are not used when cutting such gears and the shaft 77 is locked producing no input to the differential 47. However, when cutting helical gears, the differential change gears 76 must be used to provide the proper additional indexing drive to produce the required helix angle on the workpiece 19. But, during the pure radial feed portion of a plunge approach cycle, this additional indexing drive must not be effective. In this case, the clutch 75 is used to disengage the differential change gears 76 from the feed drive during the plunge portion of the cycle. The brake 75a is used to lock the shaft 77 in order to prevent spurious rotation of the differential input gear 80 due to the indexing power transmitted through the differential during operation of the machine. When the work slide 24 reaches the proper depth as determined by the cam 154 and the radial feed control, a signal must be provided to engage clutches 75 and 182 and to disengage brake 75a to proceed with the axial feed portion of the cycle. This signal is provided by the limit switches (not shown) associated with the cam 154. These switches also control the required radial feed and axial feed sequencing required for the automatic cycle. Different cam controlled limit switches associated with the cam shaft 155 may be used to control various functions of the radial feed system depending upon which type of automatic cycle is selected. That is, they may be used in conjunction with radial feed, axial feed or combinations of radial and axial feeds, either simultaneously or sequentially, to provide a wide variety of automatic cycles.

I claim as my invention:

1. A hobbing machine having a rotatable work spindle for supporting a generally cylindrical workpiece during a hobbing operation, a tool spindle rotated in timed relation to rotation of said work spindle and supporting a hob for cutting teeth on the workpiece, an axial feed mechanism connected to move one of the spindles axially of the workpiece, a radial feed mechanism responsive to a signal and connected to move one of the spindles radially of the workpiece to a position corresponding to the magnitude of such signal, means coupled to said axial feed mechanism for generating a signal normally varying in magnitude as a predetermined function of the relative position of the spindles axially of the workpiece, selectively adjustable means for causing said signal to have different fractional values of its normal magnitude, and means for supplying said signal to said radial feed mechanism.

2. A hobbing machine having a rotatable work spindle for supporting a workpiece during a hobbing operation, a tool spindle rotated in timed relation to rotation of said work spindle and supporting a hob for cutting teeth on the workpiece, work and tool supports mounting the respective spindles for movement of said tool spindle both axially and radially relative to said work spindle, an axial feed mechanism connected to one of said supports and operable to move said tool spindle axially of and relative to said work spindle, a radial feed mechanism connected to one of said supports and responsive to a signal to move said tool spindle radially of and relative to said work spindle to a position corresponding to the magnitude of such signal, means coupled to said axial feed mechanism for generating an electrical signal which normally varies in magnitude as a predetermined function of the relative position of said tool spindle axially of said work spindle, selectively adjustable means for causing said electrical signal to have different fractional values of its normal magnitude, and means for supplying said electrical signal to said radial feed mechanism.

3. A hobbing machine having a rotatable work spindle for supporting a generally cylindrical workpiece during a hobbing operation, a tool spindle rotated in timed relation to rotation of said work spindle and supporting a hob for cutting teeth on the workpiece, an axial feed mechanism connected to move one of the spindles axially of the workpiece, a radial feed mechanism responsive to a signal and connected to move one of the spindles radially of the workpiece to a position corresponding to the magnitude of such signal, means coupled to said axial feed mechanism for generating a command signal normally varying in magnitude as a predetermined function of the relative position of the spindles axially of the workpiece, selectively adjustable means for creating an auxiliary offset signal which is variable to have different selected magnitudes, and means for causing said radial feed mechanism to change the relative position of the spindles radially of the workpiece in accordance with the sum of said command signal and said offset signal.

4. A hobbing machine having a rotatable work spindle for supporting a workpiece during a hobbing operation, a tool spindle rotated in timed relation to rotation of said work spindle and supporting a hob for cutting teeth on the workpiece, work and tool supports mounting the respective spindles for movement of said tool spindle both axially and radially relative to said work spindle, an axial feed mechanism connected to one of said supports and operable to move said tool spindle axially of and relative to said work spindle, a radial feed mechanism connected to one of said supports to move said tool spindle radially of and relative to said work spindle, means coupled to said axial feed mechanism for generating an electrical signal which normally varies in magnitude as a predetermined function of the relative position of said tool spindle axially of said work spindle, selectively adjustable means for creating an auxiliary offset signal which is variable to have different selected magnitudes, and means for causing said radial feed mechanism to move said tool spindle radially of and relative to said work spindle to a position corresponding to the sum of said electrical signal and said offset signal.

5. A hobbing machine as defined in claim 4 further including second selectively adjustable means for causing said electrical signal to have different fractional values of its normal magnitude.

6. A hobbing machine having a rotatable work spindle for supporting a workpiece during a hobbing operation, a tool spindle rotated in timed relation to rotation of said work spindle and supporting a hob for cutting teeth on the workpiece, work and tool supports mounting the respective spindles for movement of said tool spindle both axially and radially relative to said work spindle, an axial feed mechanism connected to one of said supports and operable to move said sool spindle axially of and relative to said work spindle, a fluid-operated actuator connected to one of said supports and operable as an incident to receiving pressure fluid to move said tool spindle radially of and relative to said work spindle, valve means connected to control the supply of pressure fluid to and from said actuator and responsive to a variable command signal for causing the position of the tool spindle radially of and relative to the work spindle to agree with the magnitude of such signal, means coupled to said axial feed mechanism for generating a command signal which normally varies in magnitude as a predetermined function of the relative position of said tool spindle axially of said work spindle, and means for supplying said command signal to said valve means.

7. A hobbing machine as defined in claim 6 further including second valve means connected to selectively deliver pressure fluid to said actuator at a flow rate sufficiently high to cause the relative movement of said tool spindle radially of said work spindle to proceed at a faster rate than occurs when pressure fluid is being supplied to said actuator through said first valve means, said first and second valve means being connected to a common source of pressure fluid.

8. A hobbing machine having a rotatable work spindle for supporting a generally cylindrical workpiece during a hobbing operation, a tool spindle rotated in timed relation to rotation of said work spindle and supporting a hob for cutting teeth on the workpiece, an axial feed mechanism connected to move one of the spindles axially of the workpiece, a radial feed mechanism responsive to a signal and connected to move one of the spindles radially of the workpiece to a position corresponding to the magnitude of such signal, a rotatable cam connected to be driven by said axial feed mechanism and turnable about an axis in proportion to changes in the relative positions of said spindles axially of the workpiece, various portions of the periphery of said cam being spaced different distances from said axis in accordance with a predetermined function, a signal generator having an element for sensing the periphery of the cam and operable to produce a signal which varies in magnitude as said element senses different portions of the periphery of the cam during rotation of the latter, and means for supplying said signal to said radial feed mechanism.

9. A hobbing machine having a rotatable work spindle for supporting a workpiece during a hobbing operation, a tool spindle rotated in timed relation to rotation of said work spindle and supporting a hob for cutting teeth on the workpiece, work and tool supports mounting the respective spindles for movement of said tool spindle both axially and radially relative to said work spindle, an axial feed mechanism connected to one of said supports and operable to move said tool spindle axially of and relative to said work spindle through a cutting stroke of predetermined length, a radial feed mechanism connected to one of said supports and responsive to an electrical signal to move said tool spindle radially of and relative to said work spindle to a position corresponding to the magnitude of such signal, a rotatable cam connected to be driven by said axial feed mechanism and turnable about an axis in proportion to relative movement of said tool spindle axially of said work spindle, the periphery of said cam being arranged around said axis in accordance with a predetermined function such that a point riding against and following the periphery of the cam is displaced toward and away from said axis according to the function, a signal generator having a displacable element riding against and following the periphery of said cam and operable to produce an electrical signal which normally varies in magnitude in proportion to the displacement of said element, and circuit means for supplying said signal to said signal to said radial feed mechanism.

10. A hobbing machine as defined in claim 9 further including a shaft connected to be driven by said axial feed mechanism and defining said axis, and means mounting said cam for rotation with said shaft and selectively adjustable to permit angular adjustment of said cam on said shaft, whereby different points on the periphery of said cam may be moved against said displaceable element when said tool spindle is in a given position axially of said work spindle.

11. A hobbing machine as defined in claim 10 in which said cam is a circular disk eccentrically mounted on said shaft, said disk being normally adjusted on said shaft with its high point disposed against said displaceable element when the axis of said tool spindle is located midway of said cutting stroke.

12. A hobbing machine as defined in claim 9 further including means for selectively disconnecting said axial feed mechanism from its respective support while still maintaining the driving connection between said axial feed mechanism and said cam.

13. A hobbing machine as defined in claim 9 further including selectively adjustable means for causing said electrical signal to have different fractional values of its normal magnitude.

14. A hobbing machine as defined in claim 13 further including second selectively adjustable means for creating an auxiliary offset signal which is variable to have different selected magnitudes, said circuit means including means for combining said electrical signal with said offset signal and for causing said radial feed mechanism to keep said tool spindle radially positioned relative to said work spindle in agreement with the sum of said electrical and offset signals as the electrical signal varies.

15. A hobbing machine as defined in claim 14 in which said radial feed mechanism comprises a fluid-operated actuator, and valve means responsive to said electrical and offset signals and connected to control the supply of pressure fluid to and from said actuator in accordance with the sum of the electrical and offset signals.

16. A hobbing machine having a rotatable work spindle for supporting a workpiece during a hobbing operation, a tool spindle rotated in timed relation to rotation of said work spindle and supporting a hob for cutting teeth on the workpiece, a first support mounting one of the spindles for movement relative to the other spindle along the axis of said work spindle, a second support mounting one of the spindles for movement relative to the other spindle along the radius of said work spindle, an axial feed mechanism connected to said first support and operable to move said tool spindle axially of and relative to said work spindle, an actuator connected to said second support and movable in response to an electrical signal to shift said tool spindle radially of and relative to said work spindle to a position corresponding to the magnitude of such signal, means coupled to said axial feed mechanism for generating a command signal which normally varies in magnitude as a predetermined function of the relative position of said tool spindle radially of said work spindle, means coupled to said actuator and responsive to movement thereof to create a feedback signal which varies in magnitude in proportion to the amount of movement of said actuator, means for combining said first and second signals algebraically to produce an error signal, means for supplying said error signal to said actuator, and selectively adjustable means connecting said actuator to said second support for independent movement of the latter relative to said actuator and radially of said work spindle, whereby the second support may be adjusted without moving said actuator and without changing the magnitude of said feedback signal.

17. A hobbing machine as defined in claim 16 in which said means for creating said feedback signal comprises a signal generator having a displaceable element connected to be moved by said actuator and operable to produce a signal which varies in magnitude in proportion to the displacement of said element, said adjustable means connecting said second support to said actuator for selective movement of said second support independently of said displaceable element.

18. A hobbing machine having a rotatable work spindle for supporting a workpiece during a hobbing operation, a tool spindle rotated in timed relation to rotation of said work spindle and supporting a hob for cutting teeth on the workpiece, a support mounting one of the spindles for movement relative to the other spindle along the radius of said work spindle, a radial feed mechanism connected to said support and responsive to a signal to move said tool spindle radially of and relative to said work spindle to a position corresponding to the magnitude of such signal, a rotatable element, means for rotating said element at selectively adjustable speeds, a signal generator responsive to rotation of said element to produce a signal which varies in magnitude in accordance with changes in the angular position of said element, and means for supplying said signal to said radial feed mechanism.

19. A hobbing machine as defined in claim 18 in which said means for rotating said element is connected to one of said spindles to advance said one spindle along the axis of said work spindle, and means for selectively disconnecting said rotating means from said one spindle.

References Cited

UNITED STATES PATENTS

| | | | |
|---|---|---|---|
| 2,437,603 | 3/1948 | Hornfeck | 318—34 |
| 3,059,545 | 10/1962 | Sabbioni | 90—4 |
| 3,232,170 | 2/1966 | Findley | 90—4 |
| 3,254,566 | 6/1966 | Bradner | 90—4 |

ANDREW R. JUHASZ, Primary Examiner

G. WEIDENFELD, Assistant Examiner

U.S. Cl. X.R.

90—9; 318—18, 28